United States Patent
Fukumitsu et al.

[11] Patent Number: 5,703,409
[45] Date of Patent: Dec. 30, 1997

[54] ERROR COUNTING CIRCUIT

[75] Inventors: Katsumi Fukumitsu, Fukuoka; Tadayuki Takada, Kawasaki, both of Japan

[73] Assignee: Fujitsu Limited, Kanagawa, Japan

[21] Appl. No.: 283,783

[22] Filed: Aug. 1, 1994

[30] Foreign Application Priority Data

Dec. 21, 1993 [JP] Japan ................................ 5-321468

[51] Int. Cl.⁶ .................................................. G06F 11/00
[52] U.S. Cl. ......................... 371/5.1; 371/57.2; 371/5.5
[58] Field of Search ............................. 371/57.2, 5.1, 371/5.5, 66, 65, 57.1, 22; 395/183.12, 750, 564, 182.2

[56] References Cited

U.S. PATENT DOCUMENTS

| | | | |
|---|---|---|---|
| 3,827,030 | 7/1974 | Seipp | 340/172.5 |
| 4,241,450 | 12/1980 | Blatter et al. | 455/182 |
| 4,506,386 | 3/1985 | Ichikawa et al. | 455/343 |
| 4,523,231 | 6/1985 | Therrien | 358/139 |
| 4,601,057 | 7/1986 | Tsuji et al. | 382/51 |
| 4,742,518 | 5/1988 | Shedd | 371/22 |

FOREIGN PATENT DOCUMENTS

| | | |
|---|---|---|
| 59-99663 | 6/1984 | Japan. |
| 62-254532 | 11/1987 | Japan. |
| 2-112330 | 4/1990 | Japan. |
| 2019167 | 10/1979 | United Kingdom. |
| 2243056 | 10/1991 | United Kingdom. |

*Primary Examiner*—Phung Chung
*Attorney, Agent, or Firm*—Helfgott & Karas, PC

[57] ABSTRACT

An error counting circuit is adapted to count a number of code errors of a main signal in an external apparatus which is coupled to an optical transmission path. The error counting circuit includes an error counter which counts error pulses received from the external apparatus and indicative of the number of code errors of the main signal in response to clock pulses having a predetermined period and outputting a counted value for each the predetermined period, and a mechanism for stopping a counting operation of the error counter when a power failure of the external apparatus occurs, so that an erroneous counting operation of the error counter is prevented.

7 Claims, 11 Drawing Sheets

ERROR COUNTING CIRCUIT

BACKGROUND OF THE INVENTION

The present invention generally relates to error counting circuits, and more particularly to an error counting circuit for detecting a code error of a main signal in an optical transmission terminal apparatus of an optical submarine communication system.

In an optical transmission terminal apparatus which forms an optical submarine communication system or an optical submarine repeater, an optical signal is subjected to an opto-electric conversion at the receiving side of the optical transmission terminal apparatus. Thereafter, a main signal having a transmission rate of 140 Mbps, for example, is multiplexed for 4 channels and transmitted at a transmission rate of 560 Mbps. In such an optical submarine communication system, the signal received at the receiving side is demultiplexed into signals having a transmission rate of 140 Mbps, and the code error of the main signal is detected for each channel in a common apparatus which is independent of the optical transmission terminal apparatus.

Recently, the demands for the above described optical submarine communication system has increased. In addition, in order to maintain the high quality of the line, the communication system is formed from a working system and a protection system.

The switching between the working system and the protection system is made when the code error of the main signal becomes large. For this reason, there are demands to realize an error counting circuit which can accurately detect the code error of the main signal.

Figure 1:
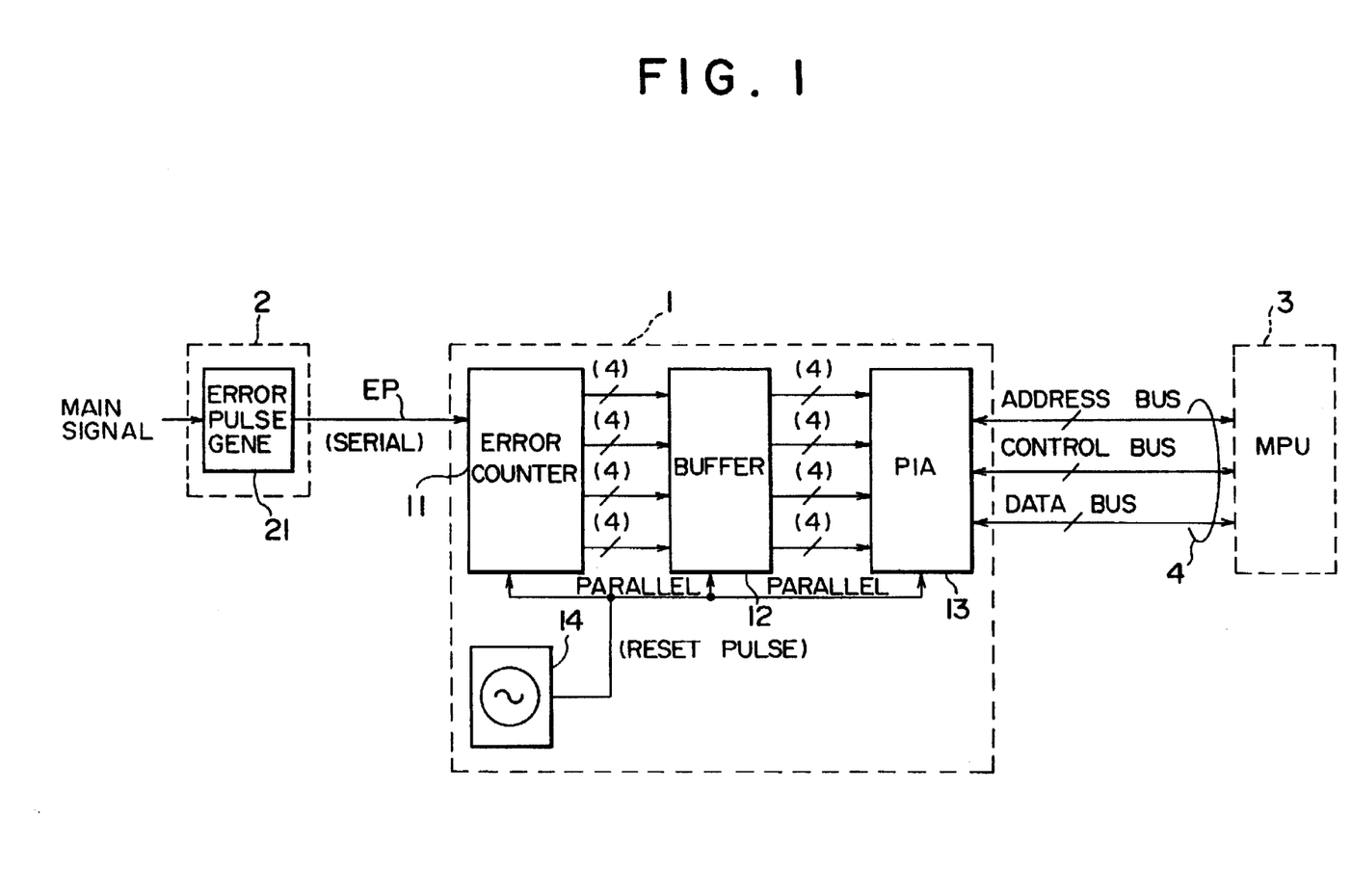
FIG. 1 is a system block diagram showing a conceivable error counting circuit.

FIG. 1 shows a conceivable error counting circuit.

An error counting circuit 1 shown in FIG. 1 is coupled to an optical transmission terminal apparatus 2 which is connected to an optical transmission path as an external apparatus. This error counting circuit 1 counts a number of code errors of a main signal in the optical transmission terminal apparatus 2.

As shown in FIG. 1, an error pulse generator 21 which generates a number of code errors of the main signal is provided in the optical transmission terminal apparatus 2. On the other hand, the error counting circuit 1 includes an error counter 11, a buffer 12, a parallel interface adapter (PIA) 13 and an oscillator 14 which are connected as shown. The error counter 11 counts error pulses EP indicating the number of code errors of the main signal from the error pulse generator 21. The error pulses EP are high-speed pulses having a period of 30 ns, for example, in correspondence with the speed of the optical transmission path. The buffer 12 outputs a counted value of the error counter 11 as a 16-bit parallel data. The PIA 13 transfers the counted value of the parallel data from the buffer 12 to an external microprocessor unit (MPU) 3 via a bus interface 4 which is made up of an address bus, a control bus and a data bus. The oscillator 14 supplies a reset pulse having a period of 1 second to the error counter 11, the buffer 12 and the PIA 13 in order to count the number of errors in 1 second.

According to this error counter circuit 1, the error counter 11 counts the error pulses EP transmitted from the optical transmission terminal apparatus 2 for 1 second, and converts the counted value into the parallel data. The counted value of the parallel data is transferred to the PIA 13 via the buffer 12. The transferred counted value is transferred from the PIA 13 to the MPU 3 via the bus interface 4.

The MPU 3 judges the line quality using the error counted value, and appropriately generates an alarm signal or makes the switching from the working system to the protection system.

However, an erroneous operation of the error counter occurs when a power failure occurs or unstable high-speed error pulses are transmitted from the optical transmission terminal apparatus or the like. The power failure may occur when the power supply of the external apparatus such as the optical transmission terminal apparatus is cut off or, the power supply voltage decreases. On the other hand, the high-speed error pulses may become unstable when a package of the error pulse generator is inserted and extracted (or connected and disconnected) with respect to the optical transmission terminal apparatus.

Japanese Laid-Open Patent Applications No.62-254532 and No.2-112330 proposed apparatuses for preventing such an erroneous operation of the error counter. However, these proposed apparatuses are constructed so that a first optical transmission terminal apparatus will not affect a second optical transmission terminal apparatus or the like at the other end when a power failure occurs in the first optical transmission terminal apparatus. Hence, these proposed apparatuses cannot be employed in a case where it is unknown whether or not the failure exists in the first optical transmission terminal apparatus.

On the other hand, another apparatus was proposed in a Japanese Laid-Open Patent Application No.59-79663. According to this proposed apparatus, the transmitting data is transmitted as it is in one system and transmitted in another system after inverting the logic of the transmitting data. At the receiving end, the inverted data is restored to the original data, and a reception process is carried out after obtaining a logical product of the data received via the two systems. However, this proposed apparatus is primarily aimed at preventing an erroneous operation caused by noise generated in the transmission path. For this reason, this proposed apparatus cannot be used to prevent the erroneous operation caused by the high-speed error pulses at the time of the power failure in the external apparatus such as the optical transmission terminal apparatus which receives the optical signals which are transmitted at a transmission rate much higher than that of the data treated in the Japanese Laid-Open Patent Application No.59-79663.

SUMMARY OF THE INVENTION

Accordingly, it is a general object of the present invention to provide a novel and useful error counting circuit in which the problems described above are eliminated.

Another and more specific object of the present invention is to provide an error counting circuit adapted to count a number of code errors of a main signal in an external apparatus which is coupled to an optical transmission path, comprising an error counter counting error pulses received from the external apparatus and indicative of the number of code errors of the main signal in response to clock pulses having a predetermined period and outputting a counted value for each the predetermined period, and means for stopping a counting operation of the error counter when a power failure of the external apparatus occurs. According to the error counting circuit of the present invention, the counting operation of the error counter is stopped when the error pulses are incorrect, by inputting separate pulses from the external apparatus indicative of whether or not the error pulses are correct or, by generating within the error counting circuit pulses indicative of whether or not the error pulses are correct. For this reason, it is possible to prevent the erroneous counting operation of the error counter even when a power failure such as a cut off of the power supply and a voltage drop of the power supply voltage occurs. The voltage drop of the power supply may occur when a package is inserted or extracted with respect to the external apparatus. In the present invention, it is possible to prevent the erroneous counting operation even when the error pulses have a high transmission rate.

Still another object of the present invention is to provide an error counting circuit described first above, wherein the means includes an enable/disable terminal which is provided on the error counter and receives a disable signal from the external apparatus when the power failure occurs in the external apparatus. According to the error counting circuit of the present invention, the error counting circuit can normally enable the operation of the error counter in response to the enable signal from an external unit, and prohibit the operation of the error counter before noise or the like is input in response to the disable signal when the power failure occurs. The counting operation can be resumed after the enable signal is input again.

A further object of the present invention is to provide an error counting circuit described first above, wherein the means includes a gate through which the error counter receives the error pulses, and the gate makes a differential input with respect to the error counter based on the error pulses from the external apparatus and inverted error pulses from the external apparatus having a phase which is inverted relative to a phase of the error pulses. According to the error counting circuit of the present invention, it is possible to eliminate the noise or the like accompanying the power failure, so that an erroneous counting operation of the error counter.

Another object of the present invention is to provide an error counting circuit described first above, wherein the means includes a circuit through which the error counter receives the error pulses, and the circuit receives from the external apparatus the error pulses and sampling pulses for detecting the error pulses in the external apparatus and supplies to the error counter only the error pulses synchronized to the sampling pulses. According to the error counting circuit of the present invention, it is possible to prevent an erroneous counting operation of the error counter because the operation of the error counter is enabled by detecting only the error pulses having an accurate or correct relationship with respect to the sampling pulses.

Still another object of the present invention is to provide an error counting circuit described first above, wherein the means includes a pulse width detector detecting whether or not a pulse width of the error pulses is normal and disabling the counting operation of the error counter when an abnormal pulse width of the error pulses is detected, and the pulse width detector includes means for delaying the error pulses by a delay time corresponding to a period of the error pulses in order to detect whether or not the pulse width of the error pulses is normal. Since the error pulses output from an error pulse generator of an external unit may have a predetermined period, the present invention detects the pulse width by delaying the error pulses input to the error counter only for this period. According to the error counting circuit of the present invention, it is possible to prevent an erroneous counting operation of the error counter by prohibiting the operation of the error counter when the error pulses having a width other than a predetermined width are detected.

A further object of the present invention is to provide an error counting circuit described first above, wherein the means includes a pulse width detector detecting whether or not a pulse width of the error pulses is normal and disabling the counting operation of the error counter when an abnormal pulse width of the error pulses is detected, and there is further provided a correction counter counting the error pulses when the pulse width detector detects an abnormal pulse width of the error pulses and outputting a counted value in parallel with a counted value of the error counter. Since the error pulses output from an error pulse generator of an external unit may have a predetermined period, the present invention detects the pulse width of the error pulses input to the error counter, and the counting operation is carried out in the correction counter when the error pulses having a width other than the predetermined width are detected. According to the error counting circuit of the present invention, the value of the error counter and the value of the correction counter are output to an external unit, so that a true error counter value can be detected by subtracting the value of the correction counter from the value of the error counter. The erroneous counting operation of the error counter can thus be prevented.

Other objects and further features of the present invention will be apparent from the following detailed description when read in conjunction with the accompanying drawings.

DESCRIPTION OF THE PREFERRED EMBODIMENTS

Figure 2:
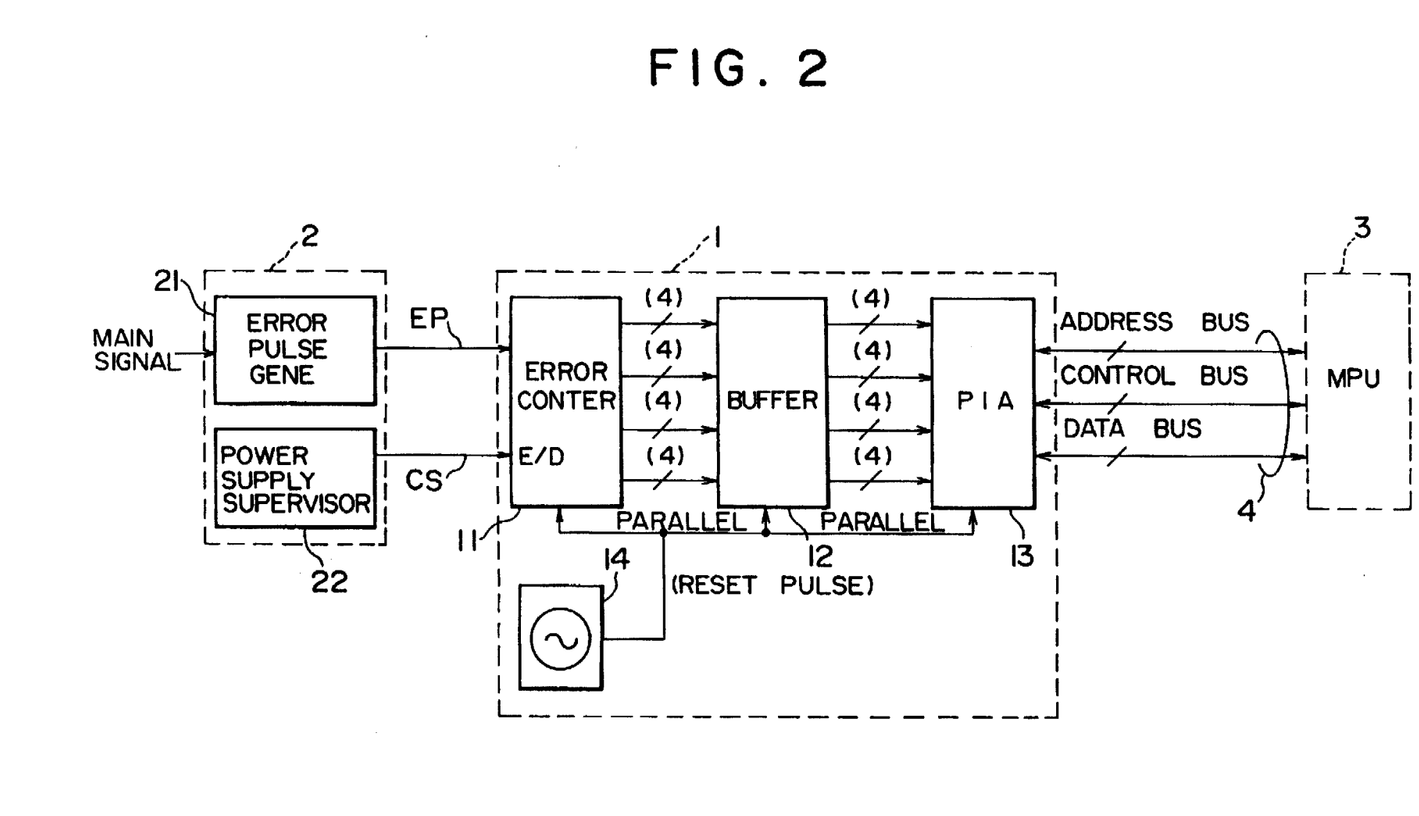
FIG. 2 is a system block diagram showing a first embodiment of an error counting circuit according to the present invention.
Figure 3:
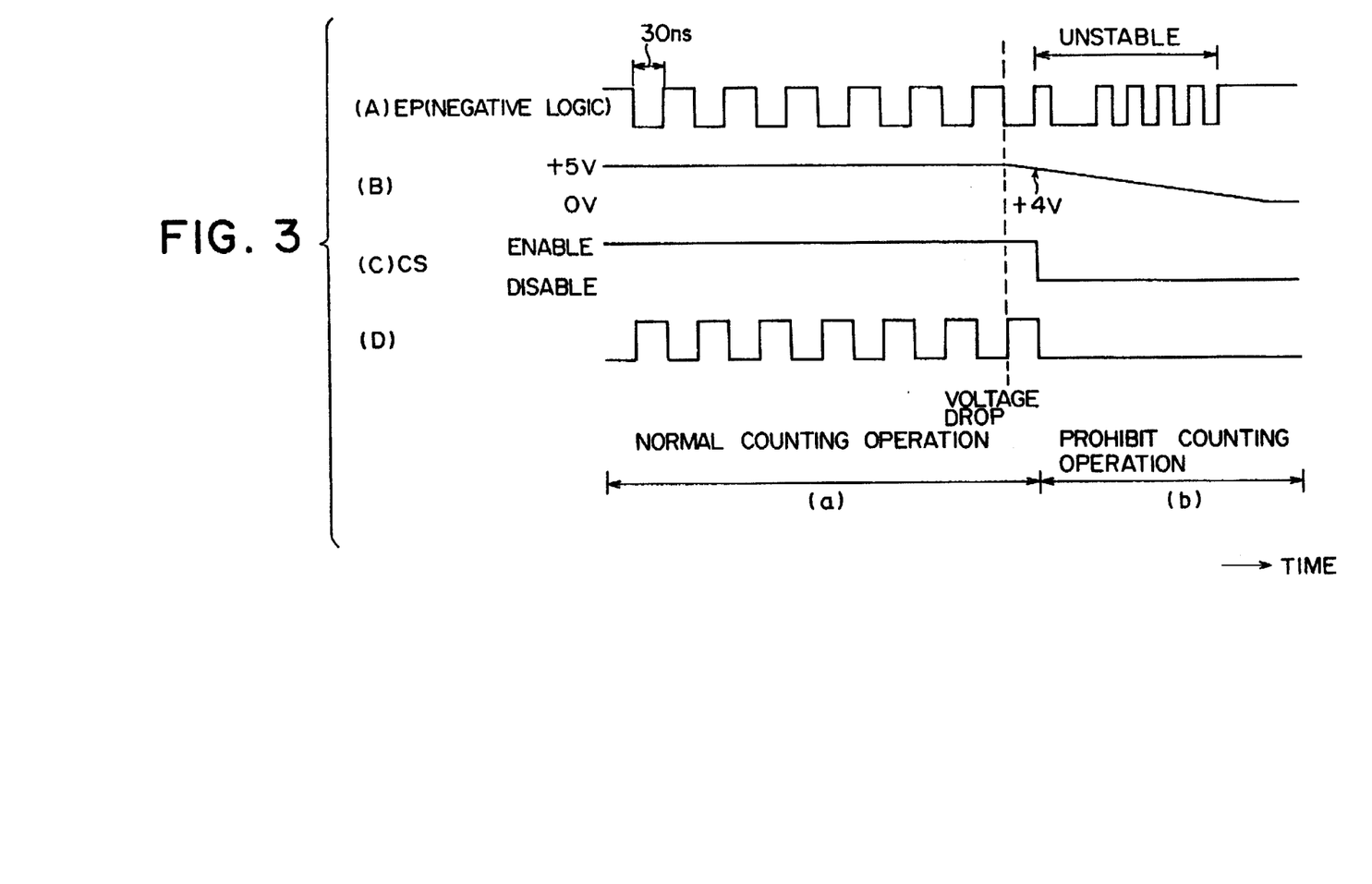
FIG. 3 is a timing chart showing timings (A) through (D) for explaining the operation of the first embodiment.

First, a description will be given of a first embodiment of an error counting circuit according to the present invention, by referring to FIGS. 2 and 3. FIG. 2 shows the first embodiment, and FIG. 3 is a timing chart showing timings (A) through (D) for explaining the operation of the first embodiment. In FIG. 2, those parts which are the same as those corresponding parts in FIG. 1 are designated by the same reference numerals, and a description thereof will be omitted.

In this embodiment, an optical transmission terminal apparatus 2 is used as an external apparatus. This optical transmission terminal apparatus 2 includes an error pulse generator 21, and a power supply supervisor 22 for supervising a power supply voltage of the optical transmission terminal apparatus 2 and detecting a voltage drop or power failure. The voltage drop detected by the power supply supervisor 22 includes a voltage drop that occurs when a package is inserted or extracted with respect to the optical transmission terminal apparatus 2. This power supply supervisor 22 supplies an enable signal or a disable signal as a control signal CS to an enable/disable terminal E/D of an error counter 11 within an error counting circuit 1. The error counter 11 is enabled when the enable signal is supplied to the enable/disable terminal E/D, and the counting operation of the error counter 11 stops when the disable signal is supplied to the enable/disable terminal E/D. Otherwise, the construction of the error counting circuit 1 is basically the same as that of the conceivable error counting circuit shown in FIG. 1.

The operation of this embodiment will now be described with reference to the timing chart shown in FIG. 3.

First, when the power supply voltage of the optical transmission terminal apparatus 2 is normal, the error pulses EP from the error pulse generator 21 have a negative logic and a constant period of 30 ns, for example, as shown on the left portion (a) of FIG. 3(A). The error pulses EP are thus supplied to the error counter 11 at a high speed.

In this state, the power supply voltage of the optical transmission terminal apparatus 2 is +5 V as shown on the left portion (a) of FIG. 3(B). In addition, the power supply supervisor 22 generates an enable signal having a logic value "1" as the control signal CS, as shown on the left portion (a) of FIG. 3(C).

Accordingly, the error counter 11 carries out a normal counting operation as shown on the left portion (a) in FIG. 3(D).

On the other hand, in a case where the power supply voltage of the optical transmission terminal apparatus 2 gradually decreases from +5 V as shown on a right portion (b) in FIG. 3(B), the power supply supervisor 22 switches from the enable signal to the disable signal, that is, drops the level, at the time when the power supply voltage becomes +4 V. Hence, this disable signal is supplied to the error counter 11 as the control signal CS.

In other words, in this particular case, when the power supply voltage further decreases from +4 V, the error pulses EP become unstable as shown on the right portion (b) of FIG. 3(A). For this reason, when the counting operation is carried out with respect to such unstable error pulses EP, an erroneous counted value will be obtained. Hence, in this embodiment, the control signal CS is switched from the enable state to the disable state, so that the counting operation of the error counter 11 is interrupted until the power supply voltage returns to the normal +5 V as shown on the right portion (b) of FIG. 3(D). When a reset pulse is supplied from the oscillator 14 to the error counter 11 during this time when the counting operation is interrupted, the error counter 11 is reset as described above.

In the case shown in FIG. 3(A), the unstableness of the error pulses EP results in pulses having a period which is smaller than that of the original high-speed error pulses EP. Hence, the error counter 11 would originally not be able to count such high-speed pulses caused by the unstableness of the error pulses EP. However, the unstableness of the error pulses EP may result in pulses having a period greater than that of the original high-speed error pulses EP, and the counting operation must be interrupted or prohibited as described above.

According to this embodiment, even when a power failure such as a voltage drop or a cut off of the power supply occurs, the noise caused thereby will not operate the error counter 11. As a result, it is possible to positively prevent the erroneous counting operation of the error counting circuit 1.

Figure 4:
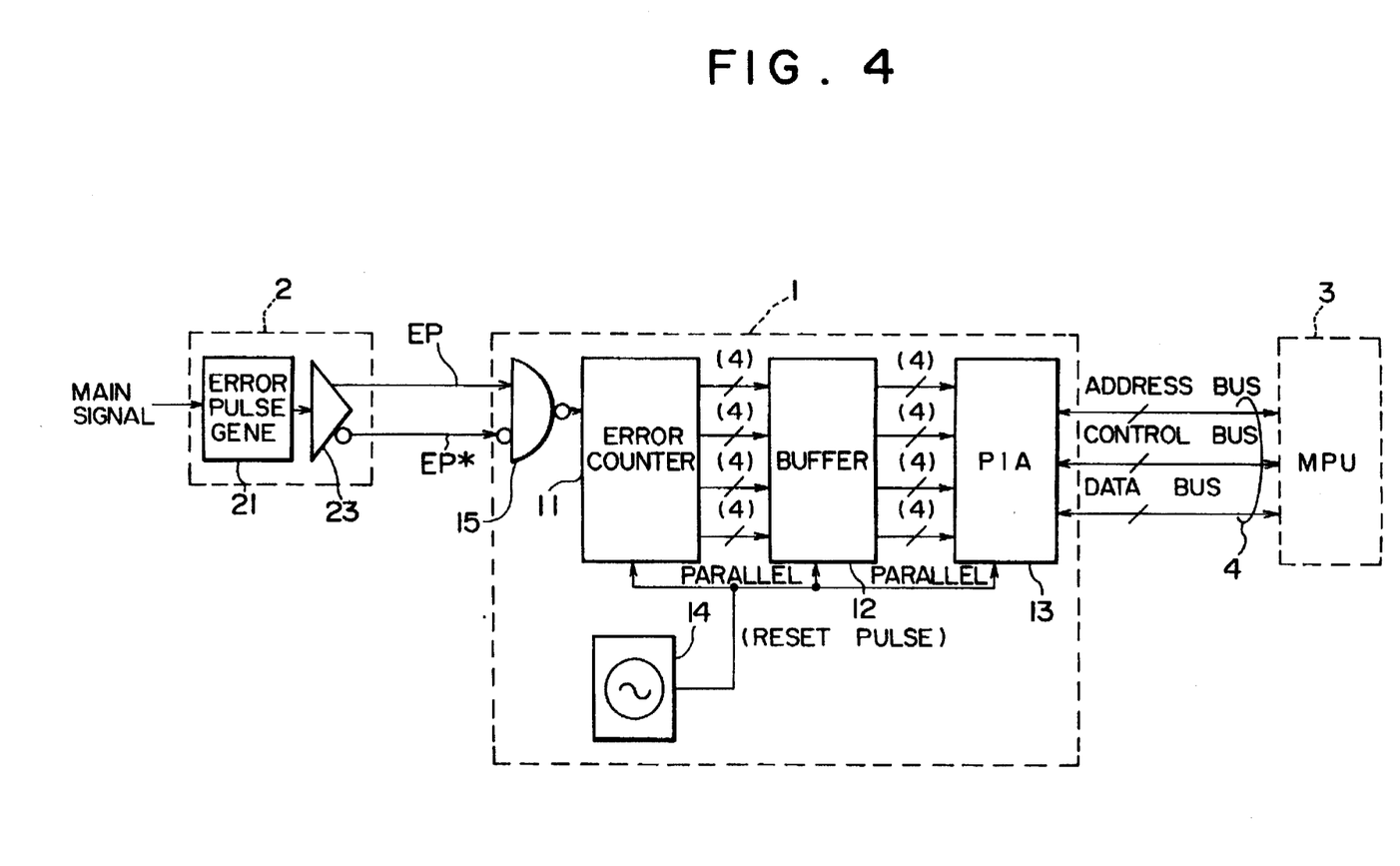
FIG. 4 is a system block diagram showing a second embodiment of the error counting circuit according to the present invention.
Figure 5:
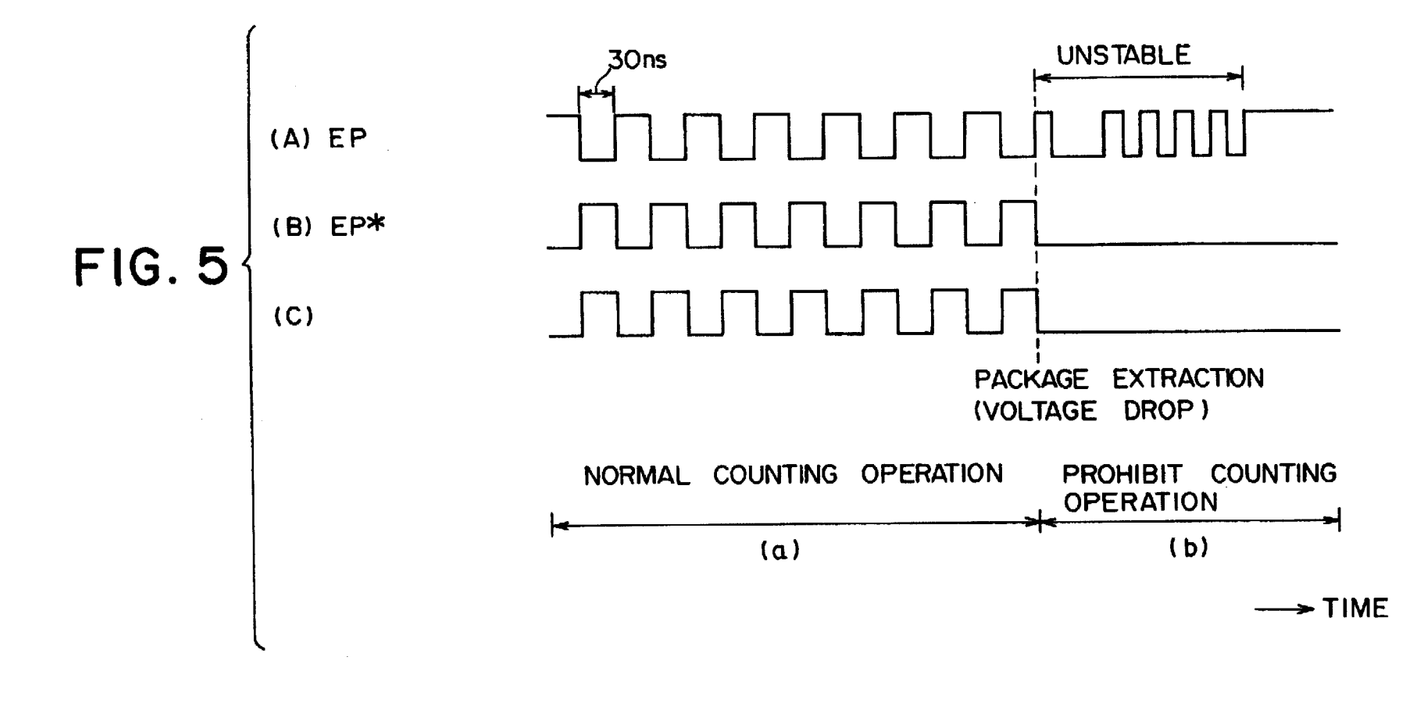
FIG. 5 is a timing chart showing timings (A) through (C) for explaining the operation of the second embodiment.

Next, a description will be given of a second embodiment of the error counting circuit according to the present invention, by referring to FIGS. 4 and 5. FIG. 4 shows the second embodiment, and FIG. 5 is a timing chart showing timings (A) through (C) for explaining the operation of the second embodiment. In FIG. 4, those parts which are the same as those corresponding parts in FIG. 1 are designated by the same reference numerals, and a description thereof will be omitted.

In this embodiment, an optical transmission terminal apparatus 2 is used as an external apparatus. This optical transmission terminal apparatus 2 includes an error pulse generator 21 and a gate 21 for making a differential output. This gate 23 is provided on an output side of the error pulse generator 21. The gate 23 outputs the error pulses EP from the error pulse generator 21 as it is as shown on a left portion (a) of FIG. 5(A), and also outputs inverted error pulses EP* as shown on the left portion (a) of FIG. 5(B) by inverting the error pulses EP.

In addition, the error counting circuit 1 of this embodiment is provided with a NAND gate 15 in a stage preceding the error counter 11. This NAND gate 15 receives the error pulses EP and the inverted error pulses EP* output from the gate 23 of the optical transmission terminal apparatus 2, and further inverts the inverted error pulses EP* so as to match the phase thereof to the phase of the error pulses EP before obtaining the logical product of the two.

The operation of this embodiment will now be described with reference to the timing chart shown in FIG. 5. In FIG. 5, it is assumed for the sake of convenience that the voltage drop occurs due to the extraction of the package from the optical transmission terminal apparatus 2.

First, when the power supply of the optical transmission terminal apparatus 2 is operating normally, the gate 23 which receives the error pulses EP from the error pulse generator 21 periodically outputs the high-speed error pulses EP shown on the left portion (a) of FIG. 5(A) having a constant period of 30 ns, for example, and also outputs the inverted error pulses EP* shown on the left portion (a) of FIG. 5(B). The phase of the inverted error pulses EP* is completely inverted with respect to the error pulses EP.

Accordingly, the NAND gate 15 of the error counting circuit 1 obtains the logical product of the error pulses EP and pulses which are obtained by further inverting the inverted error pulses EP*, and supplies the obtained pulses to the error counter 11. Hence, the error counter 11 carries out a normal counting operation as shown on the right portion (a) of FIG. 5(C).

On the other hand, when the power supply voltage of the optical transmission terminal apparatus 2 drops, for example, the gate 23 no longer carries out a normal operation. Hence, it becomes impossible to output from the gate 23 the error pulses EP shown on the left portion (a) of FIG. 5(A) and the inverted pulses EP* shown on the left portion (a) of FIG. 5(B) which are completely inverted in phase relative to one another. In other words, the error pulses EP become unstable as shown on the right portion (b) of FIG. 5(A), and the inverted error pulses EP* only show a constant logic value as shown on the right portion (b) of FIG. 5(B).

Hence, when the NAND gate 15 receives the error pulses EP shown on the right portion (b) of FIG. 5(A) and the inverted error pulses EP* shown on the right portion (b) of FIG. 5(B), the NAND gate 15 cannot output correct error pulses. As a result, the counting operation of the error counter 11 is interrupted from the time when the package is extracted from the optical transmission terminal apparatus 2, as shown on the right portion (b) of FIG. 5(C). In this case, the error counter 11 also resumes the counting operation when the operation of the gate 23 returns to normal.

Figure 6:
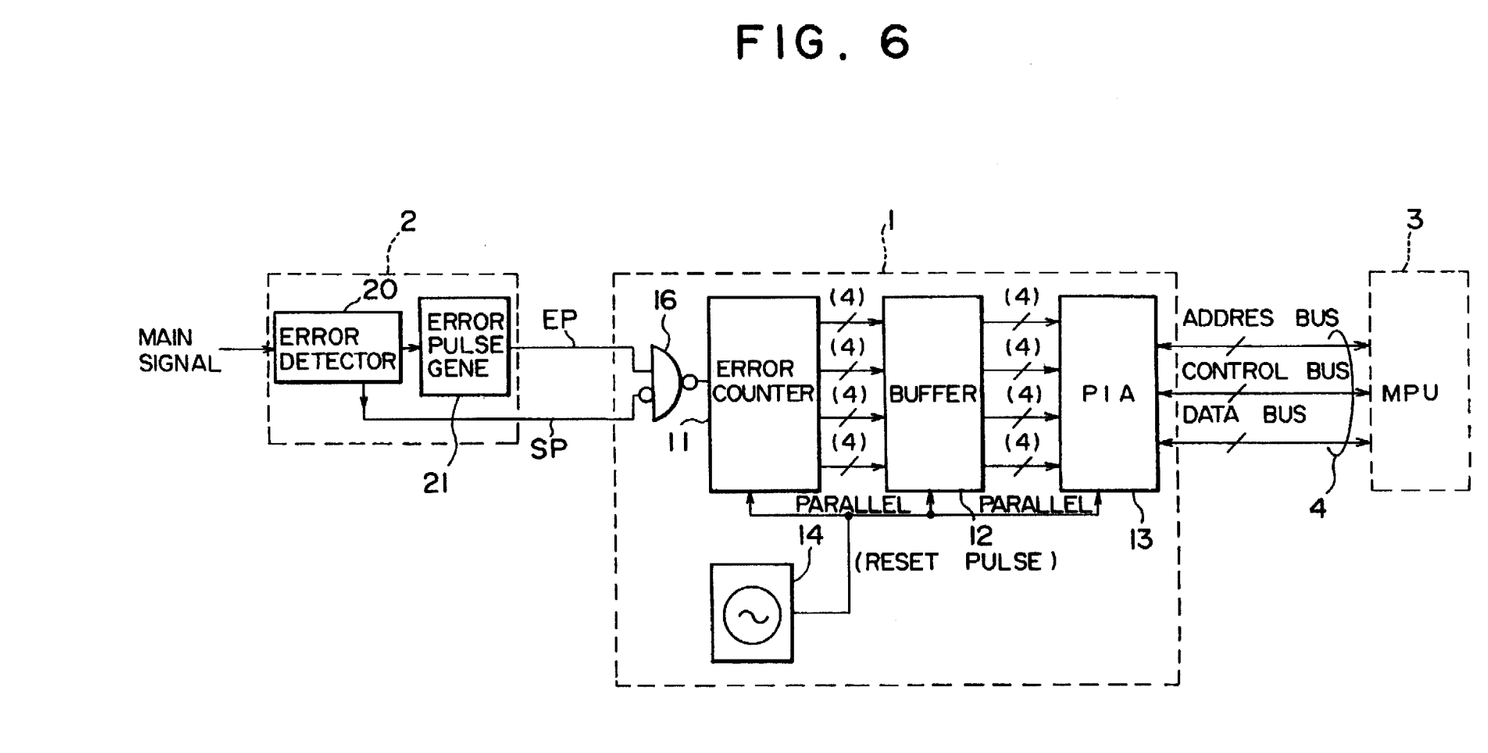
FIG. 6 is a system block diagram showing a third embodiment of the error counting circuit according to the present invention.
Figure 7:
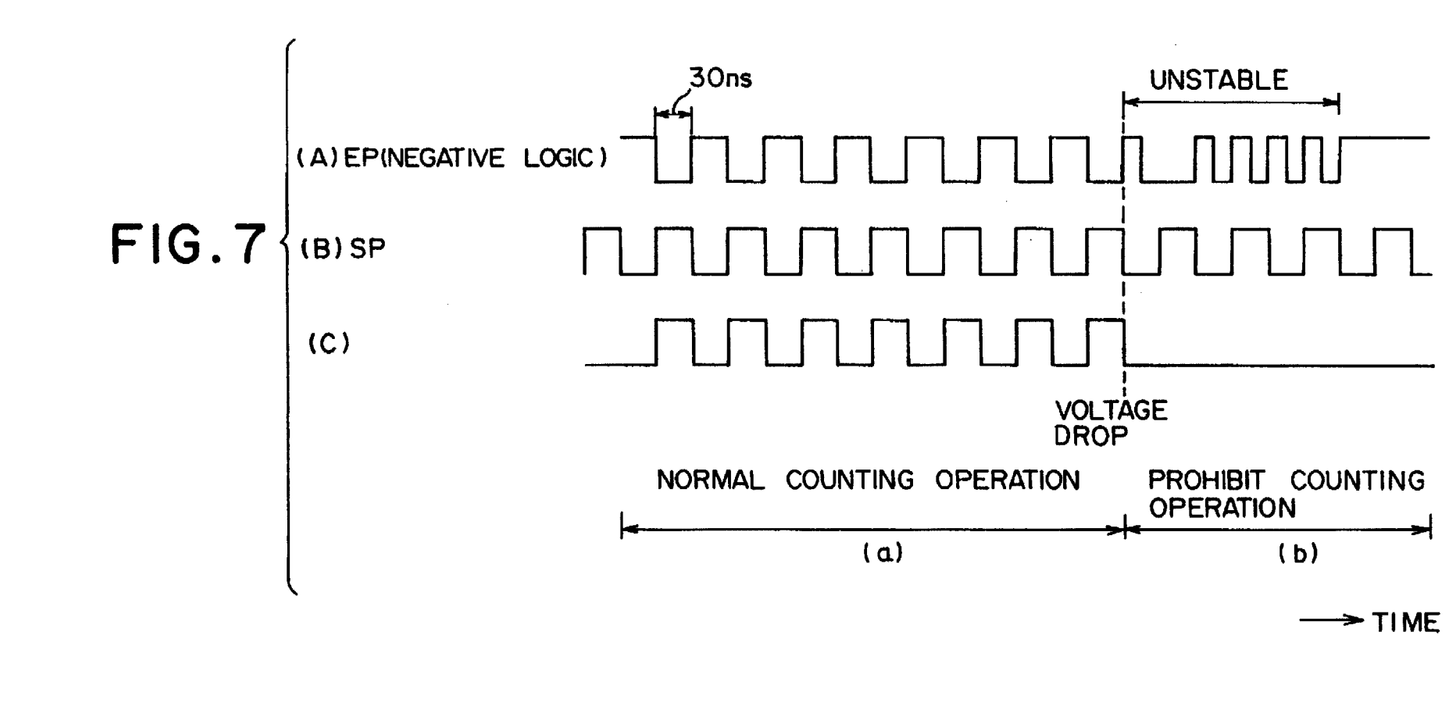
FIG. 7 is a timing chart showing timings (A) through (C) for explaining the operation of the third embodiment.

Next, a description will be given of a third embodiment of the error counting circuit according to the present invention, by referring to FIGS. 6 and 7. FIG. 6 shows the third embodiment, and FIG. 7 is a timing chart showing timings (A) through (C) for explaining the operation of the third embodiment. In FIG. 6, those parts which are the same as those corresponding parts in FIG. 1 are designated by the same reference numerals, and a description thereof will be omitted.

In this embodiment, an optical transmission terminal apparatus 2 is used as an external apparatus. This optical transmission terminal apparatus 2 includes an error detector 20 and an error pulse generator 21. The error detector 20 is provided in a stage preceding the error pulse generator 21, and outputs sampling pulses SP which are used within the error detector 20 in order to detect the error pulses.

On the other hand, in the error counting circuit 1, a NAND gate 16 is provided in a stage preceding the error counter 11. This NAND gate 16 receives the error pulses EP from the error pulse generator 21 of the optical transmission terminal apparatus 2 and the sampling pulses SP output from the error detector 20 of the optical transmission terminal apparatus 2. The NAND gate 16 obtains a NAND of the error pulses EP and pulses obtained by inverting the sampling pulses SP, and supplies an output to the error counter 11.

A description will now be given of the operation of this embodiment, by referring to the timing chart shown in FIG. 7.

First, when the power supply voltage in the optical transmission terminal apparatus 2 is normal, the error pulses EP output from the error pulse generator 21 have the negative logic with a constant period as shown on a left portion (a) of FIG. 7(A). In addition, the sampling pulses SP having a phase completely inverted from the phase of the error pulses EP and synchronized to the error pulses EP are output from the error detector 20 as shown on the left portion (a) of FIG. 7(B).

Accordingly, the NAND gate 16 which receives the error pulses EP and the sampling pulses SP inverts the sampling pulses SP similarly to the case shown in FIG. 5, and outputs pulses having the logic value "1" only when both the pulses have the logic value "0". The output pulses of the NAND gate 16 are supplied to the error counter 11, and the error counter 11 carries out the counting operation with a constant period as shown on the left portion (a) of FIG. 7(C).

On the other hand, when a power failure or the like is generated in the optical transmission terminal apparatus 2, the error pulses EP output from the error pulse generator 21 become unstable as shown on the right portion (b) of FIG. 7(A).

However, the sampling pulses SP output from the error detector 20 which is provided at the stage preceding the error pulse generator 21 are uneasily affected by the power supply fluctuation, and the error detector 20 continues to output pulses which are similar to those in the normal state as shown on the right portion (b) of FIG. 7(B).

Hence, when the NAND is obtained between the error pulses EP and the inverted pulses of the sampling pulses SP, the error counter 11 interrupts the counting operation as shown on the right portion (b) of FIG. 7(C) in response to the output pulses of the NAND gate 6.

The output pulses of the NAND gate 16 may be unstable and include minute pulses. However, the error counter 11 cannot follow such a high-speed unstableness of the pulses, and accordingly will not count such minute pulses.

In addition, the error counter 11 resumes the normal counting operation in response to the output pulses of the NAND gate 16 when the error pulses EP return to normal.

Figure 8:
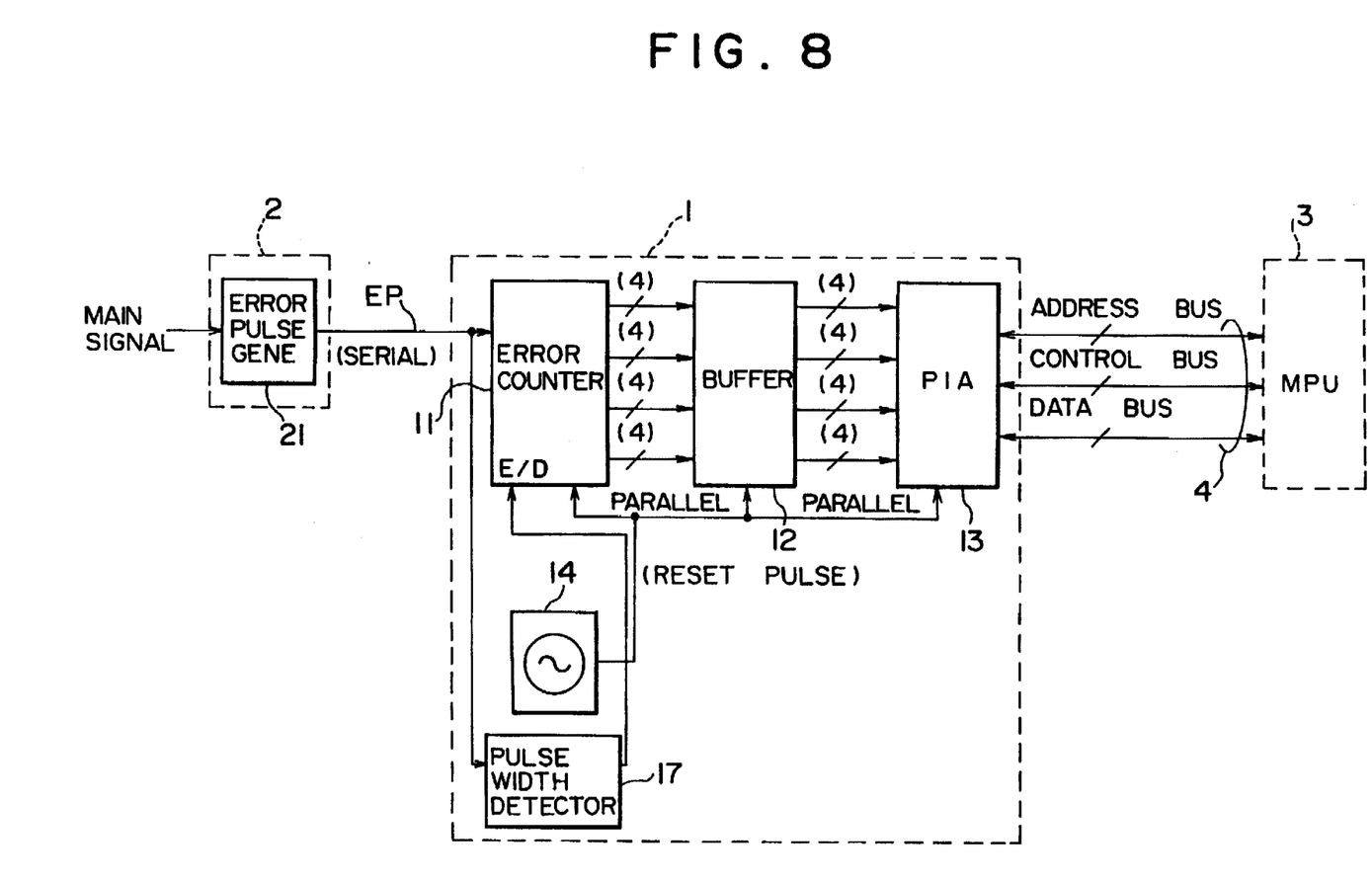
FIG. 8 is a system block diagram showing a fourth embodiment of the error counting circuit according to the present invention.
Figure 9:
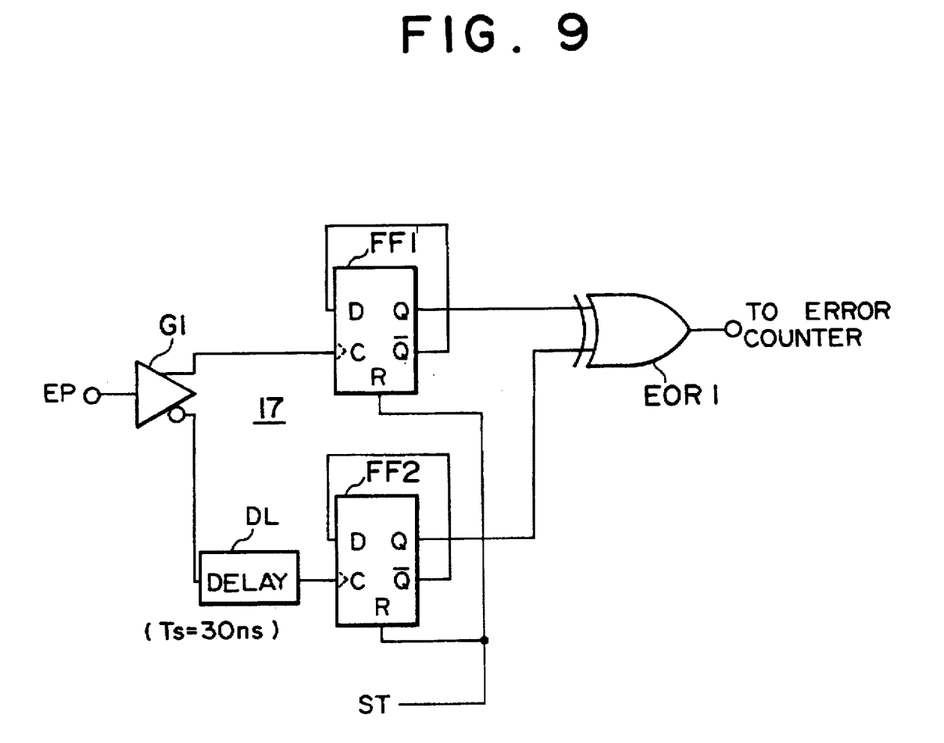
FIG. 9 is a circuit diagram showing an embodiment of a pulse width detector.
Figure 10:
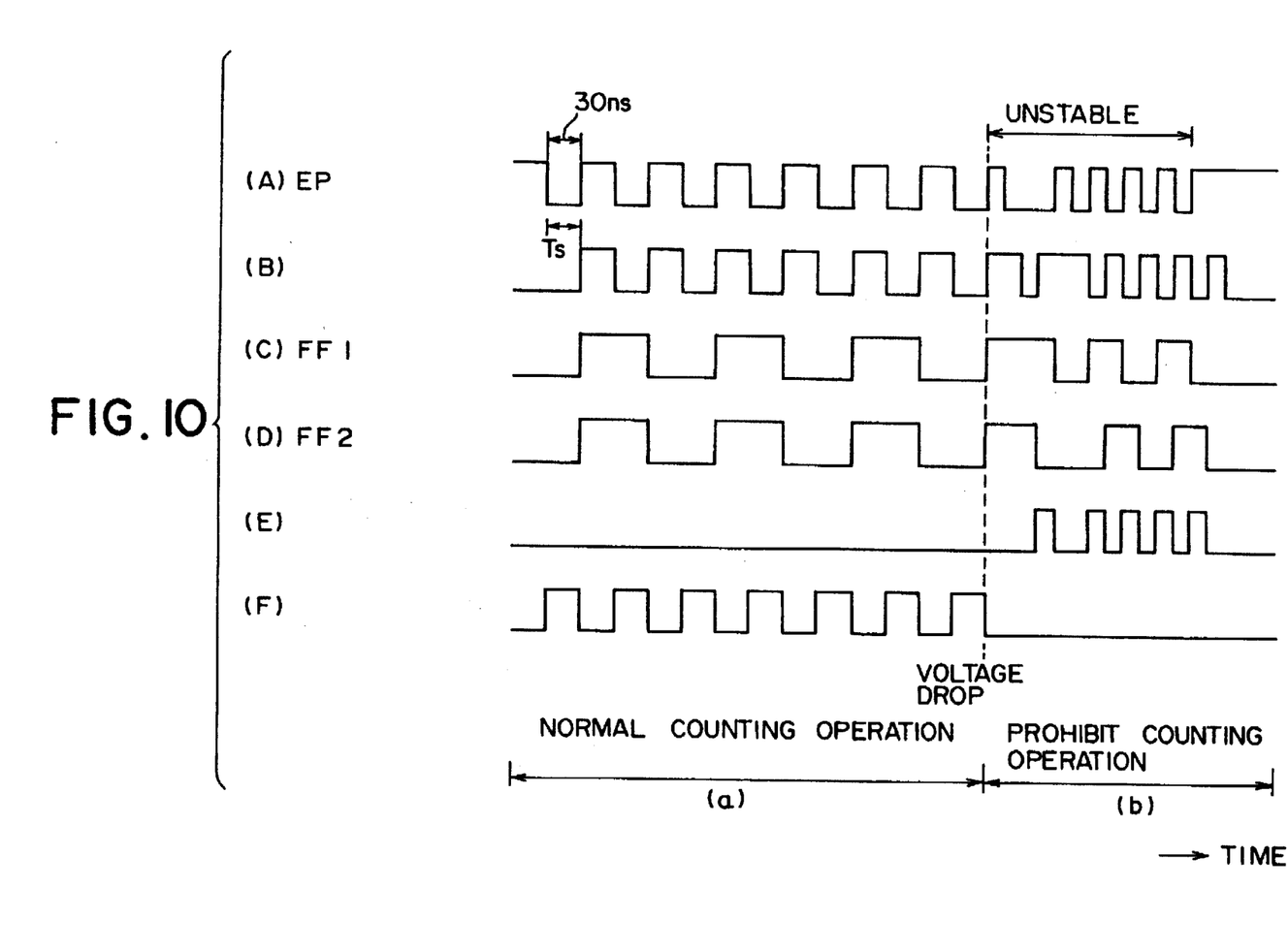
FIG. 10 is a timing chart showing timings (A) through (F) for explaining the operation of the fourth embodiment.

Next, a description will be given of a fourth embodiment of the error counting circuit according to the present invention, by referring to FIGS. 8, 9 and 10. FIG. 8 shows the fourth embodiment, and FIG. 9 shows a pulse with detector shown in FIG. 8. FIG. 10 is a timing chart for explaining the operation of the fourth embodiment. In FIG. 8, those parts which are the same as those corresponding parts in FIG. 1 are designated by the same reference numerals, and a description thereof will be omitted.

In this embodiment, an optical transmission terminal apparatus 2 is used as an external apparatus and includes an error pulse generator 21. On the other hand, the error counting circuit 1 includes a pulse width detector 17 for detecting a pulse width of the error pulses output from the error pulse generator 21, so that the pulses having a pulse width less than or equal to a predetermined pulse width is excluded from the counting operation of the error counter 11.

FIG. 9 shows an embodiment of the pulse width detector 17. The pulse width detector 17 includes a gate G1, flip-flops FF1 and FF2, a delay circuit DL and an exclusive-OR gate EOR1. In this embodiment, the error pulses EP are input to the gate G1 which outputs pulses having the same polarity as the error pulses EP and pulses having a polarity inverted from that of the error pulses EP. Hence, this gate G1 is similar to the gate 23 of the optical transmission terminal apparatus 2 shown in FIG. 4. Non-inverted pulses from the gate G1 are supplied as clock pulses to a clock terminal C of the flip-flop FF1 which makes a ½ frequency division. On the other hand, the inverted pulses from the gate G1 are supplied to a clock terminal C of the flip-flop FF2 via the delay circuit DL. The delay circuit DL delays the inverted pulses by a predetermined time Ts of 30 ns, for example. The flip-flop FF2 also makes a ½ frequency division. Outputs from terminals Q of the flip-flops FF1 and FF2 are supplied to the exclusive-OR gate EOR1. A data terminal D is connected to a terminal Q-bar for each of the flip-flops FF1 and FF2. In addition, both the flip-flops FF1 and FF2 can be reset by a power-ON reset signal RST which is supplied to a reset terminal R.

A description will now be given of the operation of this embodiment, by referring to the timing chart shown in FIG. 10.

First, the error pulses EP shown on the left portion (a) of FIG. 10(A) are output from the error pulse generator 21 of the optical transmission terminal apparatus 2 and are supplied to the error counter 11 within the error counting circuit 1. Hence, the error counter 11 carries out the counting operation similarly as in the case shown in FIG. 1 described above.

At the same time, the error pulses EP are also supplied to the pulse width detector 17 within the error counting circuit 1. Hence, the gate G1 outputs the pulses having the same pulse as the error pulses EP and supplies these pulses to the flip-flop FF1 as the clock pulses. In addition, the gate G1 outputs the pulses having the phase that is inverted from the error pulses EP and supplies these inverted pulses to the flip-flop FF2 via the delay circuit DL. In other words, the delay circuit DL outputs error pulses shown on the left portion (a) of FIG. 10(B).

The flip-flop FF1 frequency-divides the error pulses EP by 2 and outputs pulses shown on the left portion (a) of FIG. 10(C). In addition, the flip-flop FF2 frequency divides the error pulses output from the delay circuit DL by 2 and output pulses shown on the left portion (a) of FIG. 10(D).

Accordingly, if the pulse width of the error pulses EP is normal, the output pulses of the flip-flops FF1 and FF2 will be synchronized. If the pulses supplied to the exclusive-OR gate EOR1 are synchronized, the output of the exclusive-OR gate EOR1 will have the logic value "0" as shown on the left portion (a) of FIG. 10(E). Since this output of the exclusive-OR gate EOR1 is supplied to the enable/disable terminal E/D of the error counter 11 as the enable signal, the error counter 11 carries out a normal counting operation as shown on the left portion (a) of FIG. 10(F).

On the other hand, if the power supply voltage of the optical transmission terminal apparatus 2 fluctuates and the error pulses EP become unstable as shown on the right portion (b) of FIG. 10(A), the output error pulses of the delay circuit DL become as shown on the right portion (b) of FIG. 10(B). In addition, the output pulses of the flip-flops FF1 and FF2 respectively become as shown on the right portion (b) of FIG. 10(C) and FIG. 10(D). Therefore, the output of the exclusive-OR gate EOR1 becomes as shown on the right portion (b) of FIG. 10(E) in correspondence with the unstableness of the error pulses EP.

In this case, the output of the exclusive-OR gate EOR1 shown on the right portion (b) of FIG. 10(E) is supplied to the enable/disable terminal E/D of the error counter 11 as the disable signal, the counting operation is prohibited during the time in which the error pulses EP are unstable, as shown on the right portion (b) of FIG. 10(F).

In other words, in this embodiment, a predetermined delay is given with respect to the pulse width (20 ns) of the error pulses EP, and the pulse width is supervised during this time. In addition, it is possible to eliminate all of the noise greater than or smaller than this pulse width. Thus, the constant error pulse width (30 ns) is supervised, and the counting operation of the error counter 11 is prohibited for other pulse widths.

Figure 11:
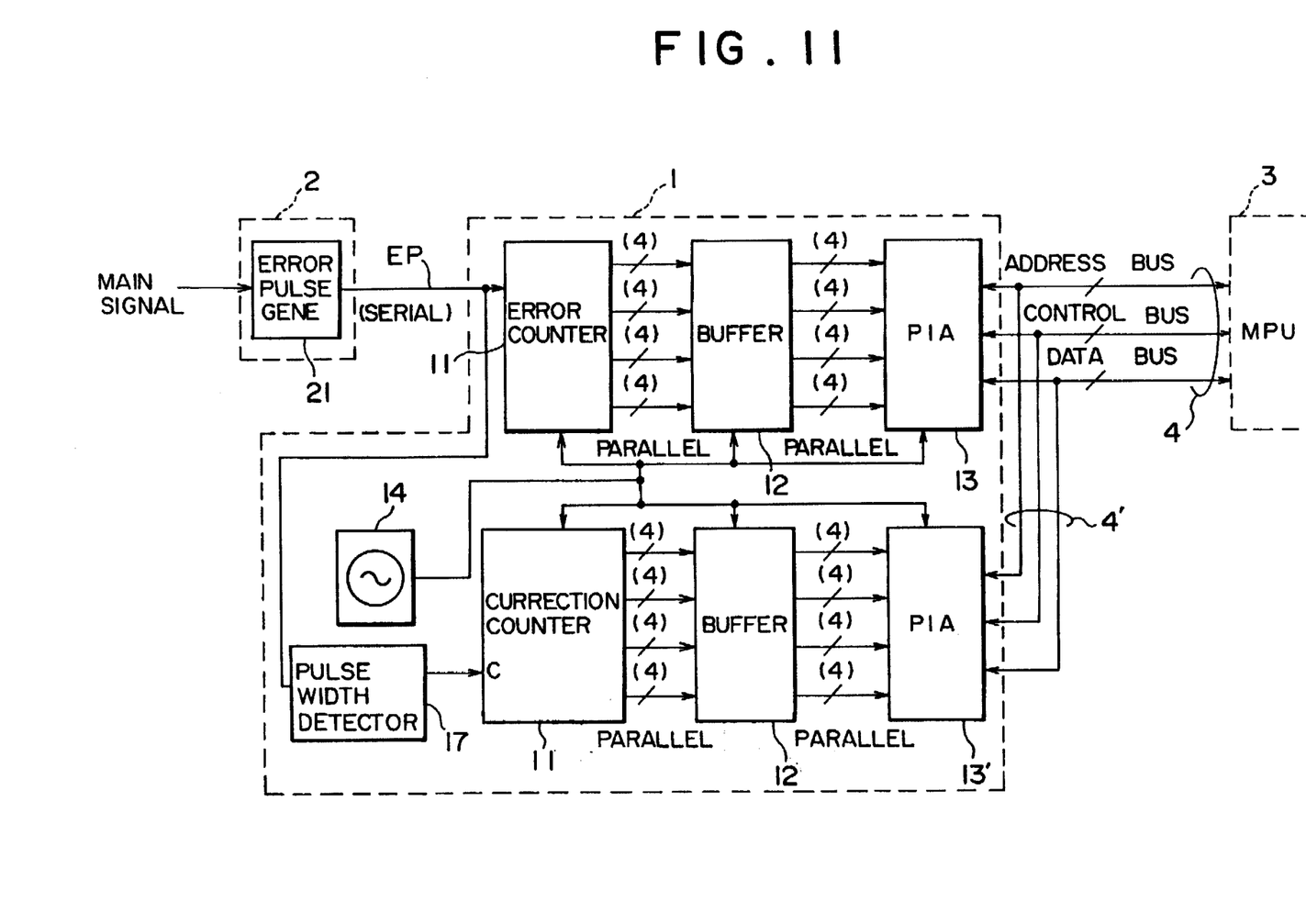
FIG. 11 is a system block diagram showing a fifth embodiment of the error counting circuit according to the present invention.

Next, a description will be given of a fifth embodiment of the error counting circuit according to the present invention, by referring to FIG. 11. FIG. 11 shows the fifth embodiment. In FIG. 11, those parts which are the same as those corresponding parts in FIG. 8 are designated by the same reference numerals, and a description thereof will be omitted.

In this embodiment, the pulse width detector 17 described above is provided in the error counting circuit 1. In addition, in the error counting circuit 1, a correction counter 11', a buffer 12' and a PIA 13' are provided in addition to the error counter 11, the buffer 12 and the PIA 13. The output pulses of the pulse width detector 17 are supplied to the correction counter 11'. An interface bus 4' is provided with respect to the interface bus 4 which connects the PIA 13 and the MPU 3, so as to connect the PIA 13' in parallel.

The error counter 11 in this embodiment operates similarly as in the case shown in FIG. 1 described above. However, when the pulse width detector 17 generates the pulses shown on the right portion (b) of FIG. 10(E), these pulses are counted in the correction counter 11', and a counted value output from the correction counter 11' is supplied to the MPU 3 via the buffer 12', the PIA 13' and the interface bus 4'.

Accordingly, the MPU 3 can calculate the number of normal pulses by subtracting the error pulses supplied from the correction counter 11' from the counted value which is supplied from the error counter 11.

Further, the present invention is not limited to these embodiments, but various variations and modifications may be made without departing from the scope of the present invention.

What is claimed is:

1. An error counting circuit for counting a number of code errors in a main signal in an external apparatus which is coupled to an optical transmission path, said error counting circuit comprising:

an error counter for counting error pulses received from the external apparatus and indicative of the number of code errors in the main signal in response to clock pulses having a predetermined period and outputting a counted value for each said predetermined period; and means for stopping a counting operation of said error counter when a power failure of the external apparatus occurs, wherein said stopping means includes a gate through which said error counter receives the error pulses, said gate making a differential input with respect to said error counter based on the error pulses from the external apparatus and inverted error pulses from the external apparatus having a phase which is inverted relative to a phase of the error pulses.

2. The error counting circuit as claimed in claim 1, which further comprises means for supplying the clock pulses to said error counter.

3. An error counting circuit for counting a number of code errors in a main signal in an external apparatus which is coupled to an optical transmission path, said error counting circuit comprising:

an error counter for counting error pulses received from the external apparatus and indicative of the number of code errors in the main signal in response to clock pulses having a predetermined period and outputting a counted value for each said predetermined period; and means for stopping a counting operation of said error counter when a power failure of the external apparatus occurs, wherein said stopping means includes a circuit through which said error counter receives the error pulses, said circuit receiving from the external apparatus the error pulses and sampling pulses for detecting the error pulses in the external apparatus and supplying to said error counter only the error pulses synchronized to the sampling pulses;

wherein said stopping means includes a pulse width detector detecting whether or not a pulse width of the error pulses is normal and disabling the counting operation of said error counter when an abnormal pulse width of the error pulses is detected.

4. An error counting circuit for counting a number of code errors in a main signal in an external apparatus which is coupled to an optical transmission path, said error counting circuit comprising:

an error counter for counting error pulses received from the external apparatus and indicative of the number of code errors in the main signal in response to clock pulses having a predetermined period and outputting a counted value for each said predetermined period;

means for stopping a counting operation of said error counter when a power failure of the external apparatus occurs; and wherein said stopping means includes a pulse width detector for detecting whether or not a pulse width of the error pulses is normal and disabling the counting operation of said error counter when an abnormal pulse width of the error pulses is detected.

5. The error counting circuit as claimed in claim 4, wherein said pulse width detector includes means for delaying the error pulses by a delay time corresponding to a period of the error pulses in order to detect whether or not the pulse width of the error pulses is normal.

6. The error counting circuit as claimed in claim 4, which further comprises a correction counter counting the error pulses when said pulse width detector detects an abnormal pulse width of the error pulses and outputting a counted value in parallel with a counted value of said error counter.

7. The error counting circuit as claimed in claim 6, which further comprises means for supplying the clock pulses to said error counter and said correction counter.

* * * * *